(12) United States Patent
Sundararajan et al.

(10) Patent No.: US 11,418,491 B2
(45) Date of Patent: Aug. 16, 2022

(54) DYNAMIC FIREWALL DISCOVERY ON A SERVICE PLANE IN A SDWAN ARCHITECTURE

(71) Applicant: Cisco Technology Inc., San Jose, CA (US)

(72) Inventors: Balaji Sundararajan, Fremont, CA (US); Venkatesh Gota B R, Bangalore (IN); Sireesha Yeruva, Fremont, CA (US); Chandramouli Balasubramanian, Mountain View, CA (US); Anand Oswal, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 354 days.

(21) Appl. No.: 16/801,430

(22) Filed: Feb. 26, 2020

(65) Prior Publication Data

US 2021/0266291 A1    Aug. 26, 2021

(51) Int. Cl.
*H04L 9/40* (2022.01)
*H04L 1/18* (2006.01)
*H04L 45/00* (2022.01)
*H04L 69/22* (2022.01)

(52) U.S. Cl.
CPC .............. *H04L 63/029* (2013.01); *H04L 1/18* (2013.01); *H04L 45/54* (2013.01); *H04L 63/0227* (2013.01); *H04L 69/22* (2013.01)

(58) Field of Classification Search
CPC ......... H04L 63/029; H04L 1/18; H04L 45/54; H04L 63/0227; H04L 69/22; H04L 12/4633; H04L 63/0272
See application file for complete search history.

(56) References Cited

U.S. PATENT DOCUMENTS

| 7,055,207 B2 | 6/2006 | Coughlin |
| 7,249,378 B2 | 7/2007 | Wesigner et al. |
| 7,472,414 B2 | 12/2008 | Izatt et al. |

(Continued)

OTHER PUBLICATIONS

PCT Notification of Transmittal of the International Search Report and the Written Opinion of the International Searching Authority, or the Declaration, Intl. Appln. PCT/US2021/017522, dated Apr. 1, 2021.

*Primary Examiner* — Huan V Doan (74) *Attorney, Agent, or Firm* — Baker Botts, LLP (57) ABSTRACT

The present disclosure is directed to systems and methods for dynamic firewall discovery on a service plane. The method includes the steps of identifying a source data packet for transmission from a source machine at a source site to a destination machine at a destination site, wherein the source data packet corresponds to a request for connection between the source machine and the destination machine over a WAN, inspecting the source data packet at a first firewall associated with the source site, marking the source data packet with a marker to indicate inspection by the first firewall, transmitting the marked source data packet to the destination site, determining at the destination site that the source data packet has been inspected based on the marker, and forwarding the source data packet to the destination machine at the destination site, without inspection of the source data packet by a second firewall associated with the destination site.

20 Claims, 4 Drawing Sheets

(56) References Cited

U.S. PATENT DOCUMENTS

| | | |
|---|---|---|
| 9,455,956 B2 | 9/2016 | Mihelich et al. |
| 10,333,905 B2 | 6/2019 | Leon |
| 2005/0240989 A1* | 10/2005 | Kim .................... H04L 63/0254 |
| | | 726/11 |
| 2010/0008359 A1 | 1/2010 | Kay |
| 2018/0343236 A1* | 11/2018 | Pillay-Esnault ........ H04L 63/20 |

* cited by examiner

DYNAMIC FIREWALL DISCOVERY ON A SERVICE PLANE IN A SDWAN ARCHITECTURE

TECHNICAL FIELD

The present disclosure generally relates to firewall discovery, and more specifically to systems and methods for dynamic firewall discovery on a service plane in a software-defined wide area network (SDWAN) architecture.

BACKGROUND

As the flow of network information exponentially increases in today's world, computer security is an important necessity. Threats from hackers, malware, and the like may shut down or damage large computer networks, resulting in loss of significant money, resources, and time. Security measures to prevent such incidents are constantly evolving along, with the nature and sophistication of the threat. One mechanism to protect a computer network from external threats is a firewall. A firewall is a combination of hardware and software that is placed between a network and its exterior. The firewall receives all data from the network exterior before it is sent to network users. The firewall sorts and analyzes the data and determines whether it should have access to the network. If the data is authorized, the firewall forwards the data to its destination. If the data is unauthorized, the firewall denies the data access to the network.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, identifying a source data packet for transmission from a source machine at a source site to a destination machine at a destination site, wherein the source data packet corresponds to a request for connection between the source machine and the destination machine over a wide area network (WAN), inspecting the source data packet at a first firewall associated with the source site, marking the source data packet with a marker to indicate inspection by the first firewall, transmitting the marked source data packet to the destination site, determining, at the destination site, that the source data packet has been inspected based on the marker, and forwarding the source data packet to the destination machine at the destination site, without inspection of the source data packet by a second firewall associated with the destination site.

Moreover, the operations may further include identifying an acknowledgment data packet for reverse transmission from the destination machine at the destination site to the source machine at the source site, wherein the acknowledgment data packet is to be reverse transmitted in response to the source data packet. The operations may additionally include transmitting the acknowledgement data packet from the destination site to the source site without inspection of the acknowledgment data packet by the second firewall associated with the destination site, determining, at the source site, that the acknowledgment data packet is associated with the source data packet, inspecting the acknowledgment data packet at the first firewall associated with the source site; and forwarding the acknowledgment data packet to the source machine at the source site.

Additionally, the source data packet may be a SYN packet, and the acknowledgement data packet may be a SYN/ACK packet.

Moreover, the operation of marking may further include creating a flow table entry associated with the source data packet. Furthermore, the acknowledgment data packet may be determined to be associated with the source data packet based on the flow table entry.

Additionally, the marker may be a redirect flag based on a field of a Transmission Control Protocol (TCP) header of the source data packet.

According to another embodiment, a method may include the steps of identifying a source data packet for transmission from a source machine at a source site to a destination machine at a destination site, wherein the source data packet corresponds to a request for connection between the source machine and the destination machine over a wide area network (WAN), inspecting the source data packet at a first firewall associated with the source site, marking the source data packet with a marker to indicate inspection by the first firewall, transmitting the marked source data packet to the destination site, determining, at the destination site, that the source data packet has been inspected based on the marker, and forwarding the source data packet to the destination machine at the destination site, without inspection of the source data packet by a second firewall associated with the destination site.

According to yet another embodiment, one or more computer-readable non-transitory storage media may embody instructions that, when executed by a processor, cause the performance of operations, including identifying a source data packet for transmission from a source machine at a source site to a destination machine at a destination site, wherein the source data packet corresponds to a request for connection between the source machine and the destination machine over a wide area network (WAN), inspecting the source data packet at a first firewall associated with the source site, marking the source data packet with a marker to indicate inspection by the first firewall, transmitting the marked source data packet to the destination site, determining, at the destination site, that the source data packet has been inspected based on the marker, and forwarding the source data packet to the destination machine at the destination site, without inspection of the source data packet by a second firewall associated with the destination site.

Technical advantages of certain embodiments of this disclosure may include one or more of the following. The systems and methods described herein may allow for dynamic detection of firewall inspection of data packets, thereby reducing the number of inspections that may be conducted by one or more firewalls in a network. As a result, the firewall-usage count under an existing firewall license may be reduced and/or the number of data packets that may sent through a network may be increased. Additionally, the disclosed systems and methods may reduce system latency because processing times will inherently decrease as data packets undergo fewer firewall inspections.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In today's SD-WAN enterprise networks, every site, whether local or regional, is equipped with a firewall to ensure that data entering the network does not pose a threat to the network or its users. However, today's networks force application and data traffic to traverse two firewalls, i.e., at the source and the destination sites, even when both sites are part of the same trusted network. By doubling the number of firewalls that a data packet must traverse, the enterprise may be required to double its firewall usage license, as these licenses are often based on the number of connections a firewall may process at time (e.g., 2000 firewall licenses may be required for 1000 transmitted data packets that were doubly inspected at source and destination sites). Additionally, an increased number of firewalls may also result in increased network latency, as each instance of firewall processing slows down the traffic.

The present disclosure introduces system and methods for dynamically discovering firewalls on a service plane in a network, and specifically, for detecting when a first firewall has inspected a data packet, thereby avoiding a second inspection of the same packet by a second firewall in the network.

Figure 1:
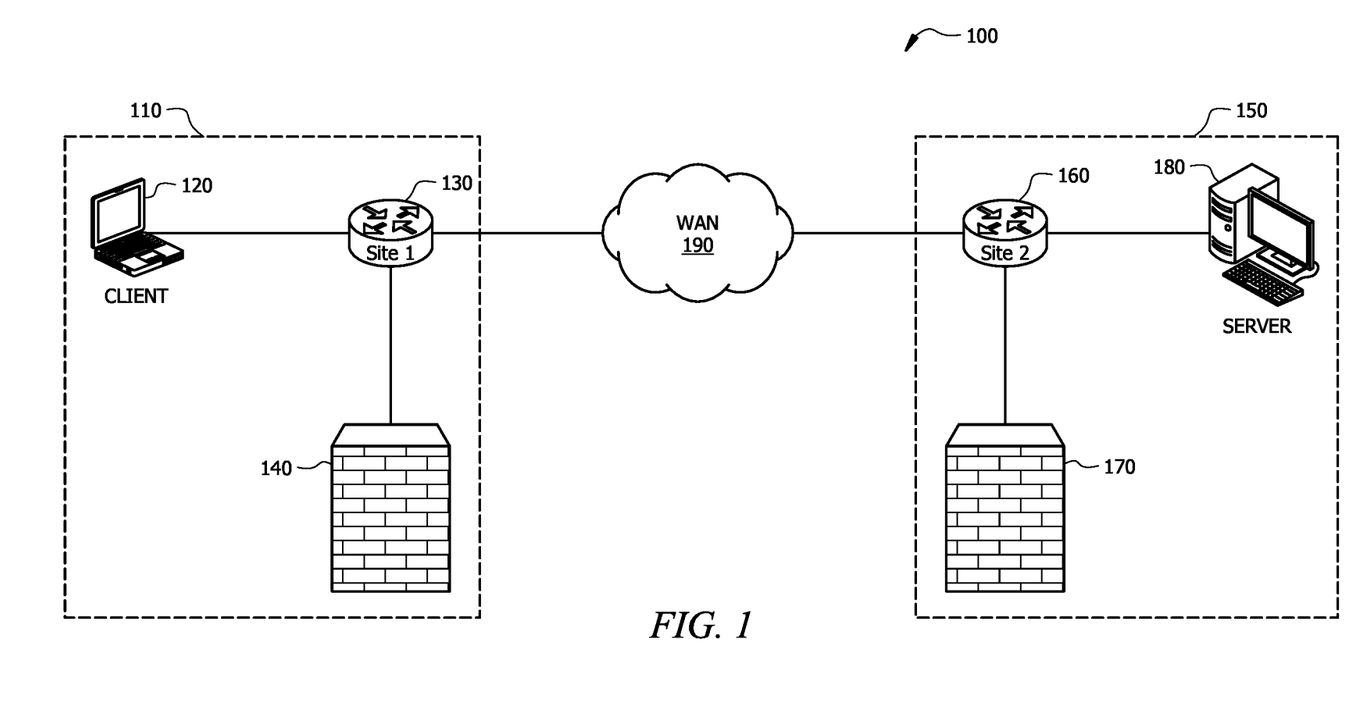
FIG. 1 illustrates a system for dynamically detecting a firewall inspection to avoid double inspection of a data packet, in accordance with certain embodiments.

FIG. 1 depicts a system 100 for detecting firewall inspection, according the present disclosure. System 100 includes a source site 110 and a destination site 150 communicatively connected through a network 190. While FIG. 1 depicts the network as a wide area network (WAN), it is to be understood that the network 190 may comprise a SD-WAN, a local area network (LAN), wireless local area network (WLAN), or any other telecommunications network known in the art.

Source site 110 of system 100 may include a source machine 120 (shown as a client computer), a source router 130, and a first firewall 140 associated with the source site 110. Destination site 150 may include a destination machine 180 (shown as a server), a destination router 160, and a second firewall 170 associated with the destination site 150.

The source site 110 and the destination site 150 may correspond to various network configurations and architectures. In one embodiment, the source machine 120 at the source site 110 may correspond to a user machine at a branch site, and the destination machine 180 at the destination site 150 may correspond to a server at a corporate data center. In another embodiment, the source machine 120 at the source site 110 may correspond to a remote user machine (such as machine used by a virtual private network (VPN) user) at a remote site, and the destination machine 180 at the destination site may correspond to a server at a corporate headquarters site. System 100 may be applicable to other use cases, as determined by those of skill in the art.

With continued reference to FIG. 1, source machine 120 may desire to establish a communication link with destination machine 180, and may initiate a Transmission Control Protocol (TCP) session to transmit a data packet from the source machine 120 at the source site 110 to the destination machine 180 at the destination site 150. For purposes of this disclosure, the data packet to be transmitted from the source site may be termed the "source data packet." The source data packet may correspond to a request for connection between the source machine 120 and the destination machine 180. In an embodiment, the source data packet may comprise a synchronize (SYN) packet. A SYN packet is a TCP packet that may be sent from a first machine (e.g., a source machine) to a second machine (e.g., a destination machine), requesting that a connection be established between them. In response to a SYN packet, the destination machine may send a synchronize/acknowledge (SYN/ACK) packet back to the source machine. The SYN and SYN/ACK packets serve as electronic "handshakes" to establish communication between the source machine 120 and the destination machine 180.

The source data packet sent from the source machine 120 may arrive at the source router 130. The source router 130 may check the source data packet and determine whether it has a flow table entry in its header; the flow table entry may indicate that the data packet has previously been seen by the source router 130. If the source data packet is a SYN packet, it would not have a flow table entry as it is its first session with source router 130. Next, per an application policy of the source site 110, the source router 130 may forward the source data packet to the first firewall 140 at the source site 110 for inspection. The first firewall 140 may inspect the source data packet and then return the source data packet back to the source router 130. The source router 130 may then mark the source data packet with a marker to indicate firewall inspection has been completed by the first firewall 140. In an embodiment, the source router 130 may mark the source data packet with a flag using TCP options. In an embodiment, the flag may comprise a custom "R" ("redirect") flag available in an Options field of the TCP header of the source data packet. The source router 130 may also create and store a flow table entry for the source data packet. The flow table entry may indicate that the source data packet is a SYN packet and that corresponding return traffic (a SYN/ACK packet) will be received from the destination site 150. Then, the source router 130 may transmit the source data packet over an encapsulated, encrypted tunnel to the destination site 150. While the description above indicates that the first firewall 140 may inspect the source data packet prior to marking the source data packet by the source router 130, it is to be understood that in some embodiments, the source router 130 may mark the source data packet before forwarding it to the first firewall 140. In other words, the sequence of certain actions may be modified, without departing from the scope of the present disclosure.

At the destination site 150, the destination router 160 may receive the source data packet. The destination router 160 may decapsulate the tunnel and inspect the source data packet. The destination router 160 may determine, based on the existence of the marker, i.e., R flag, that the source data packet has been inspected by a firewall, namely the first firewall 140. Thus, the destination router 160 may determine that there is no need to forward the source data packet to its local firewall, i.e., the second firewall 170. As a result, the destination router 160 may cache the flow table entry associated with the source data packet and then forward the source data packet to the destination machine 180 at the destination site 150 without inspection of the source data packet by the second firewall 170 associated with the destination site 150. By caching the flow table entry associated with the source data packet, the destination router 160 may later confirm the acknowledgement data packet (i.e., a reverse packet), which is associated with the source data packet and which is to be sent back along the same path. Moreover, because the source data packet was marked by a R flag, the destination router 160 may determine that a firewall inspection had already occurred, thereby avoiding a second firewall inspection. By way of example, if there was no marker (R flag) in the header of the source data packet to indicate that a firewall inspection had occurred, the destination router may determine that the source data packet is a candidate for firewall inspection, and as a result, may forward the source data packet to the second firewall 170 for inspection before forwarding the packet to the destination machine 180 associated with the destination site 150. Moreover, because firewalls are stateful, i.e., a firewall inspecting a data packet must see the flow of a given data packet in both the forward and reverse directions, an inspection of the forward flowing source data packet at the second firewall would necessitate an inspection of the associated reverse traffic at the same firewall.

In response to the source data packet (e.g., a SYN packet) sent by the source machine 120, the destination machine 180 may respond with an acknowledgement data packet (e.g., a SYN/ACK packet). Specifically, the destination machine 180 at the destination site 150 may transmit an acknowledgement data packet to the destination router 160 for reverse transmission to the source site 110. The acknowledgment data packet may be associated with (i.e., sent in response to) the source data packet sent by the source machine 120 when requesting connection with the destination machine 180.

The destination router 160 may determine that the acknowledgment data packet is associated with the flow table entry that has previously been cached (i.e., the flow table entry relating to the source data packet), and as a result, knows that the acknowledgment data packet need not be sent to the local firewall, i.e., second firewall 170 at the destination site 150. Consequently, the destination router 160 may encapsulate the acknowledgement data packet and transmit it through a tunnel from the destination site to the source site without inspection by the second firewall at the destination site.

At the source site 110, the source router 130 may inspect the acknowledgment data packet, and determine that the acknowledgment data packet is associated with the source data packet, i.e., that the acknowledgment data packet is a SYN/ACK sent in response to the SYN source data packet. This determination may be made by looking up the flow table entry associated with the acknowledgment data packet and/or the source data packet. If the source router 130 determines that there is no flow table entry associated with the acknowledgment data packet, the data packet may be dropped. In an embodiment, the source router 130 may additionally determine that the acknowledgment data packet is not marked with a "R" flag, and as a result, may forward the acknowledgement data packet to its local firewall, i.e., the first firewall 140. Because a given firewall inspecting a data packet has to see the flow of the data packet in both directions, it must also inspect the reverse traffic. In the example of FIG. 1, since the first firewall 140 inspected the source data packet, it will also inspect the reverse traffic, i.e., the acknowledgment data packet. Therefore, the first firewall 140 may inspect the acknowledgment data packet and, based on the application policies of the firewall, may make a determination to allow or deny the acknowledgement data packet. If the first firewall 140 decides to allow the acknowledgment data packet, the packet may be forwarded to the source router 130 for transmission to the source machine 120.

While two routers are shown in the system 100 of FIG. 1, it is to be understood that the source site 110 and destination site 150 may be associated with any number of routers to which and/or from which a data packet may be sent and/or received. For example, after the first firewall 140 inspects a data packet, the packet may be sent to the source router 130 or another router in the network for transmission to a client.

Figure 2:
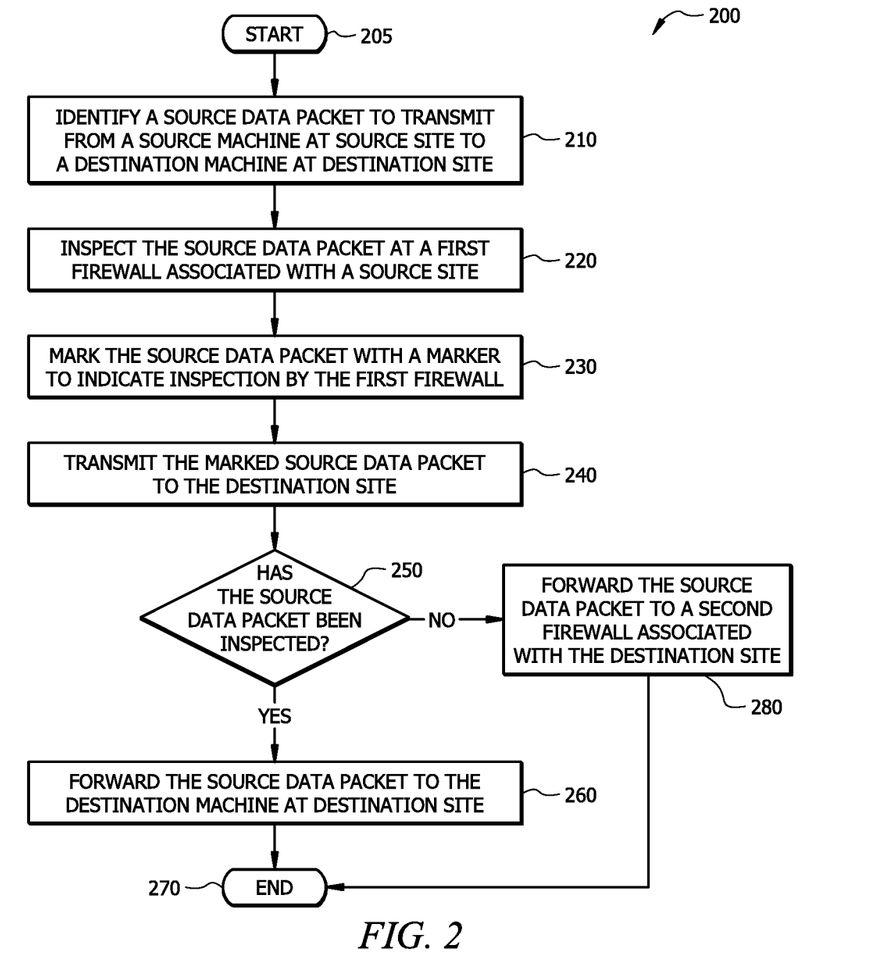
FIG. 2 illustrates a flow diagram of a method for detecting a firewall inspection based on a forward flow of a data packet, in accordance with certain embodiments.

Reference is now made to FIG. 2, wherein is shown a method 200 for detecting firewall inspection based on a forward flow of a data packet, according to the present disclosure. The method may begin at step 205. At step 210, a source data packet may be identified for transmission from a source machine at a source site to a destination machine at a destination site. The source data packet may correspond to a request for connection between the source machine and the destination machine over a network, such as a WAN. In an embodiment, the source data packet may be a SYN packet.

At step 220, the source data packet may be inspected at a first firewall associated with the source site. Assuming the source data packet passes inspection by the first firewall, then at step 230, the source data packet may mark the source data packet with a marker to indicate inspection by the first firewall. In an embodiment, the source data packet may be marked with a flag using TCP options. In an embodiment, the flag may comprise a custom "R" ("redirect") flag available in an Options field of the TCP header of the source data packet. A FTP flow table entry may also be created for the source data packet to indicate that the source data packet is a packet for requesting communication (i.e., a SYN packet) and that corresponding return traffic (i.e., a SYN/ACK packet) will be received from the destination site.

At step 240, the marked source data packet may be transmitted to the destination site over an encapsulated, encrypted tunnel. At step 250, once the tunnel has been decapsulated and the source data packet is received at the destination site, a determination may be made as to whether the source data packet has been previously inspected. This determination may be made based on the existence of the marker (R flag) in the header of the source data packet. If, at step 250, it is determined that the source data packet has been inspected, the method may proceed to step 260, wherein, after the flow table entry associated with the source data packet is cached, the source data packet may be forwarded to the destination machine at the destination site without inspection of the source data packet by a second firewall associated with the destination site. The method may end at step 270.

If, at step 250, it is determined that the source data packet has not been inspected, the method may proceed to step 280, wherein the source data packet may be forwarded to a second firewall associated at the second destination site for inspection by the second firewall. The method may end at step 270.

Figure 3:
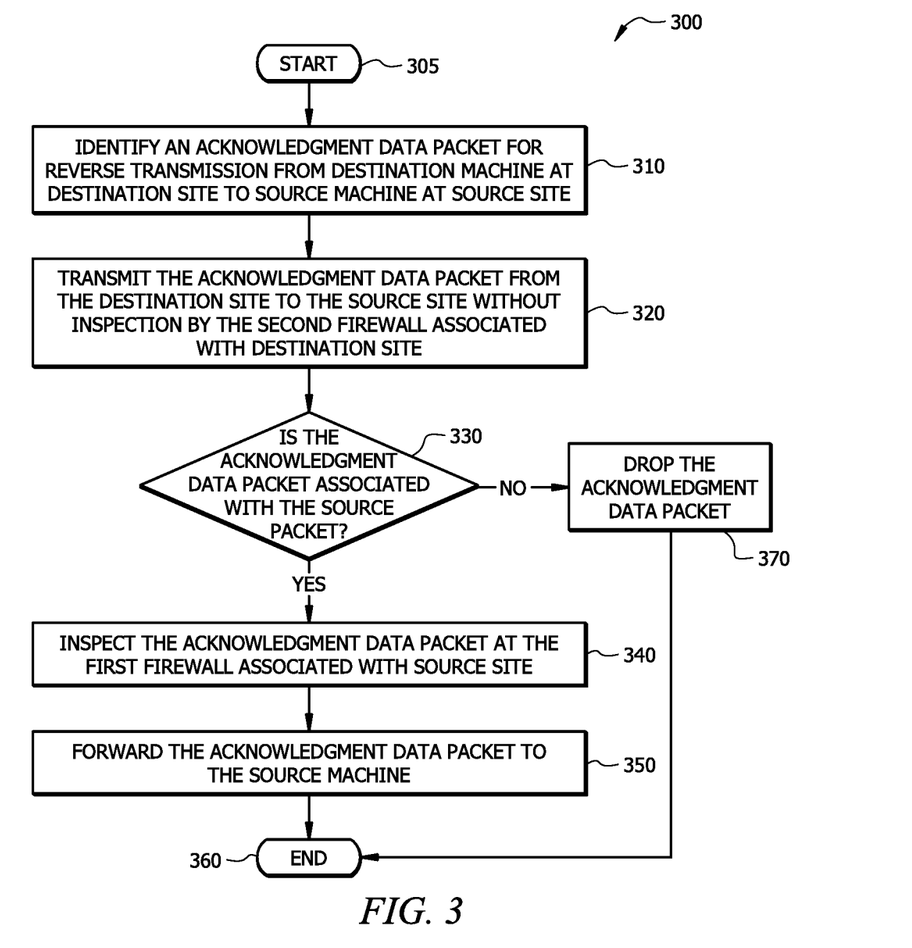
FIG. 3 illustrates a flow diagram of a method for detecting a firewall inspection based on a reverse flow of a data packet, in accordance with certain embodiments.

Reference is now made to FIG. 3, wherein is shown a method 300 for detecting firewall inspection based on a reverse flow of a data packet, according to the present disclosure. In an embodiment, the method 300 described in FIG. 3 may be a continuation of the method 200 described in FIG. 2, i.e., the acknowledgement data packet described below in conjunction with FIG. 3 may be transmitted in response to the source data packet described above in conjunction with FIG. 2.

As shown in FIG. 3, the method 300 may begin at step 305. At step 310, an acknowledgement data packet may be identified for reverse transmission from a destination machine at a destination site to a source machine at a source site. The acknowledgement data packet may be associated with a source data packet, as it may be sent in response to a request for connection sent from a source machine to the destination machine over a network. In an embodiment, the acknowledgement data packet may be a SYN/ACK packet that may be associated with or sent in response to the SYN packet described in conjunction with FIG. 2. The step of identifying at 310 may further include determining that the acknowledgement data packet is associated with the flow table entry of the source data packet that has previously been cached (e.g., step 260 of FIG. 2), and as a result, the acknowledgment data packet need not be sent to a local firewall, i.e., the second firewall associated with the destination site.

At step 320, the acknowledgement data packet may be encapsulated and transmitted through a tunnel from the destination site to a source site, without inspection of the acknowledgement data packet by the second firewall at the destination site. At step 330, once the acknowledgement data packet is received at the source site, a determination may be made as to whether the acknowledgement data packet is associated with the source data packet, namely that the acknowledgment data packet is a SYN/ACK sent in response to the SYN source data packet. This determination may be made by looking up the FTP flow table entry to verify that the acknowledgment data packet is associated with the source data packet.

If, at step 330, a determination is made that the acknowledgement data packet is not associated with the source data packet, i.e., the flow table entry fails to verify the acknowledgement data packet, the method may proceed to step 370, wherein the acknowledgement data packet is dropped. The method may end at step 360.

If, at step 330, a determination is made that the acknowledgement data packet is associated with the source data packet, i.e., the flow table entry verifies the acknowledgement data packet, the method may proceed to step 340, wherein the acknowledgement data packet may be forwarded to its local firewall, i.e., first firewall, for inspection. In other embodiments, in lieu of, or in addition to, determining that the acknowledgment data packet is associated with the source data packet, a determination may also be made that the acknowledgement data packet is not marked with a "R" flag (i.e., it was not marked at the destination site), and as a result, the acknowledgement data packet may be forwarded to the first firewall for inspection.

At step 340, the acknowledgement data packet may be inspected at the first firewall associated with the source site. Because a given firewall (here, the first firewall) inspecting a data packet has to see the flow of the data packet in both directions, it must also inspect the reverse traffic. By way of example, since the first firewall inspected the forward traffic, i.e., the source data packet in step 220 of FIG. 2, the first firewall must also inspect the reverse traffic, i.e., the acknowledgment data packet. If, based on its inspection of the acknowledgement data packet, the firewall allows the acknowledgment data packet, at step 350, the acknowledgement data packet may be forwarded to source machine associated with the source site. At step 360, the method may end.

In sum, the systems and methods of the present disclosure may allow for the dynamic detection of firewall inspection of data packets, thereby reducing by at least half the number of inspections that may conducted by one or more firewalls of a network. As a result, benefits of the disclosed systems and methods include reduction of the firewall-usage count under an existing firewall license and/or doubling the number of data packets that may sent through a network. Additionally, the disclosed systems and methods may improve system latency, as processing times will decrease as data packets are inspected by fewer firewalls.

Figure 4:
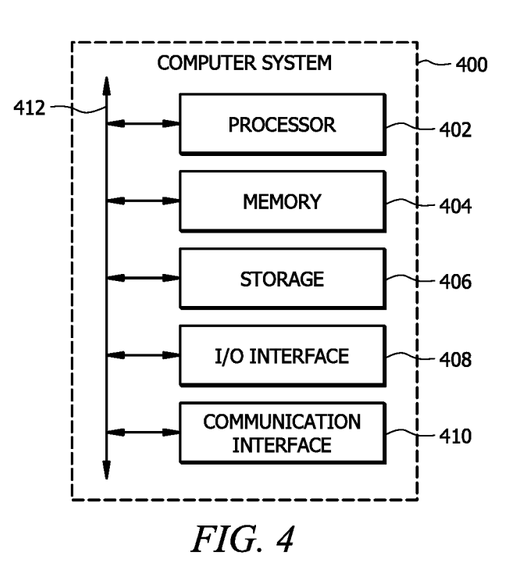
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
   identifying a source data packet for transmission from a source machine at a source site to a destination machine at a destination site, wherein the source data packet corresponds to a request for connection between the source machine and the destination machine over a wide area network (WAN);
   inspecting the source data packet at a first firewall associated with the source site;
   marking the source data packet with a marker to indicate inspection by the first firewall;
   transmitting the marked source data packet to the destination site;
   determining, at the destination site, that the source data packet has been inspected based on the marker; and
   forwarding the source data packet to the destination machine at the destination site, without inspection of the source data packet by a second firewall associated with the destination site.

2. The system of claim 1, wherein the operations further comprise:
   identifying an acknowledgment data packet for reverse transmission from the destination machine at the destination site to the source machine at the source site, wherein the acknowledgment data packet is to be reverse transmitted in response to the source data packet;

transmitting the acknowledgement data packet from the destination site to the source site without inspection of the acknowledgment data packet by the second firewall associated with the destination site;

determining, at the source site, that the acknowledgment data packet is associated with the source data packet;

inspecting the acknowledgment data packet at the first firewall associated with the source site; and forwarding the acknowledgment data packet to the source machine at the source site.

3. The system of claim 2, wherein the source data packet is a SYN packet, and the acknowledgement data packet is a SYN/ACK packet.

4. The system of claim 2, wherein the marking step further comprises:

creating a flow table entry associated with the source data packet.

5. The system of claim 4, wherein the acknowledgment data packet is determined to be associated with the source data packet based on the flow table entry.

6. The system of claim 1, wherein the marker is based on a field of a Transmission Control Protocol (TCP) header of the source data packet.

7. The system of claim 6, wherein the marker comprises: a redirect flag.

8. A method, comprising:

identifying a source data packet for transmission from a source machine at a source site to a destination machine at a destination site, wherein the source data packet corresponds to a request for connection between the source machine and the destination machine over a wide area network (WAN);

inspecting the source data packet at a first firewall associated with the source site;

marking the source data packet with a marker to indicate inspection by the first firewall;

transmitting the marked source data packet to the destination site;

determining, at the destination site, that the source data packet has been inspected based on the marker; and forwarding the source data packet to the destination machine at the destination site, without inspection of the source data packet by a second firewall associated with the destination site.

9. The method of claim 8, further comprising:

identifying an acknowledgment data packet for reverse transmission from the destination machine at the destination site to the source machine at the source site, wherein the acknowledgment data packet is to be reverse transmitted in response to the source data packet;

transmitting the acknowledgement data packet from the destination site to the source site without inspection of the acknowledgment data packet by the second firewall associated with the destination site;

determining, at the source site, that the acknowledgment data packet is associated with the source data packet;

inspecting the acknowledgment data packet at the first firewall associated with the source site; and forwarding the acknowledgment data packet to the source machine at the source site.

10. The method of claim 9, wherein the source data packet is a SYN packet, and the acknowledgement data packet is a SYN/ACK packet.

11. The method of claim 9, wherein the marking step further comprises:

creating a flow table entry associated with the source data packet.

12. The method of claim 11, wherein the acknowledgment data packet is determined to be associated with the source data packet based on the flow table entry.

13. The method of claim 8, wherein the marker is based on a field in a Transmission Control Protocol (TCP) header of the source data packet.

14. The method of claim 13, wherein the marker comprises:

a redirect flag.

15. One or more computer-readable non-transitory storage media embodying instructions that, when executed by a processor, cause the performance of operations comprising:

identifying a source data packet for transmission from a source machine at a source site to a destination machine at a destination site, wherein the source data packet corresponds to a request for connection between the source machine and the destination machine over a wide area network (WAN);

inspecting the source data packet at a first firewall associated with the source site;

marking the source data packet with a marker to indicate inspection by the first firewall;

transmitting the marked source data packet to the destination site;

determining, at the destination site, that the source data packet has been inspected based on the marker; and forwarding the source data packet to the destination machine at the destination site, without inspection of the source data packet by a second firewall associated with the destination site.

16. The one or more computer-readable non-transitory storage media of claim 15, wherein the operations further comprise:

identifying an acknowledgment data packet for reverse transmission from the destination machine at the destination site to the source machine at the source site, wherein the acknowledgment data packet is to be reverse transmitted in response to the source data packet;

transmitting the acknowledgement data packet from the destination site to the source site without inspection of the acknowledgment data packet by the second firewall associated with the destination site;

determining, at the source site, that the acknowledgment data packet is associated with the source data packet;

inspecting the acknowledgment data packet at the first firewall associated with the source site; and forwarding the acknowledgment data packet to the source machine at the source site.

17. The one or more computer-readable non-transitory storage media of claim 16, wherein the source data packet is a SYN packet, and the acknowledgement data packet is a SYN/ACK packet.

18. The one or more computer-readable non-transitory storage media of claim 16, wherein the marking step further comprises:

creating a flow table entry associated with the source data packet.

19. The one or more computer-readable non-transitory storage media of claim 18, wherein the acknowledgment data packet is determined to be associated with the source data packet based on the flow table entry.

20. The one or more computer-readable non-transitory storage media of claim 15, wherein the marker is based on a field of a Transmission Control Protocol (TCP) header of the source data packet.

\* \* \* \* \*